(12) United States Patent
Wang et al.

(10) Patent No.: US 12,429,662 B2
(45) Date of Patent: Sep. 30, 2025

(54) VR GLASSES

(71) Applicant: QINGDAO PICO TECHNOLOGY CO., LTD., Shandong (CN)

(72) Inventors: Zishang Wang, Shandong (CN); Qiang Li, Shandong (CN); Wan Li, Shandong (CN)

(73) Assignee: QINGDAO PICO TECHNOLOGY CO., LTD., Shandong (CN)

( * ) Notice: Subject to any disclaimer, the term of this patent is extended or adjusted under 35 U.S.C. 154(b) by 178 days.

(21) Appl. No.: 17/789,257

(22) PCT Filed: Sep. 6, 2021

(86) PCT No.: PCT/CN2021/116753
§ 371 (c)(1),
(2) Date: Jun. 27, 2022

(87) PCT Pub. No.: WO2022/127204
PCT Pub. Date: Jun. 23, 2022

(65) Prior Publication Data
US 2023/0305263 A1  Sep. 28, 2023

(30) Foreign Application Priority Data
Dec. 18, 2020 (CN) .......................... 202011505781.1

(51) Int. Cl.
*G02B 7/02* (2021.01)
*G02B 7/00* (2021.01)
*G06F 1/16* (2006.01)

(52) U.S. Cl.
CPC ............. *G02B 7/023* (2013.01); *G02B 7/002* (2013.01); *G02B 7/021* (2013.01); *G06F 1/163* (2013.01)

(58) Field of Classification Search
CPC ........ G02B 7/023; G02B 7/002; G02B 7/021; G06F 1/163
(Continued)

(56) References Cited

U.S. PATENT DOCUMENTS

2020/0057240 A1\* 2/2020 Yu ........................ G03B 21/145
2020/0117012 A1    4/2020 Wen et al.

FOREIGN PATENT DOCUMENTS

CN      205720893 U      11/2016
CN      205809418 U      12/2016
(Continued)

OTHER PUBLICATIONS

Office action received from Chinese Patent Application No. 202011505781.1 mailed on Apr. 16, 2024, 14 pages (5 pages English Translation and 9 pages Original Copy).
(Continued)

*Primary Examiner* — Bumsuk Won
*Assistant Examiner* — Mitchell T Oestreich

(57) ABSTRACT

This disclosure provides virtual reality (VR) glasses. The VR glasses include: a bottom plate, two communicating light-transmitting holes being provided on the bottom plate symmetrically; a first sealing part and a second sealing part, which are both made of a silica gel material and are fixed onto the bottom plate, and the first sealing part and the second sealing part are in one-to-one correspondence with positions of the two light-transmitting holes; and a first lens barrel and a second lens barrel, the first lens barrel communicates with one of the two light-transmitting holes through the first sealing part, and the second lens barrel communicates with the other one of the two light-transmitting holes through the second sealing part, and the first lens barrel and the second lens barrel are configured to be able to move toward each other.

9 Claims, 4 Drawing Sheets

(58) Field of Classification Search
USPC .......................................................... 359/821
See application file for complete search history.

(56) References Cited

FOREIGN PATENT DOCUMENTS

| | | | |
|---|---|---|---|
| CN | 206074917 U | | 4/2017 |
| CN | 206311843 U | | 7/2017 |
| CN | 206515552 U | | 9/2017 |
| CN | 206788464 U | | 12/2017 |
| CN | 207925020 U | | 9/2018 |
| CN | 209433128 U | | 9/2019 |
| CN | 209471302 U | * | 10/2019 |
| CN | 112558303 A | | 3/2021 |
| CN | 112630972 A | | 4/2021 |
| CN | 213023776 U | | 4/2021 |
| CN | 214041888 U | | 8/2021 |
| CN | 214623187 U | | 11/2021 |

OTHER PUBLICATIONS

Second Office Action for Chinese Application No. 202011505781.1, mailed Nov. 14, 2024, 5 pages.
International Search Report and Written Opinion for International Application No. PCT/CN2021/116753, mailed Nov. 24, 2021, 17 Pages.

* cited by examiner

VR GLASSES

CROSS-REFERENCE TO RELATED APPLICATION

The disclosure is a national stage application of International Patent Application No. PCT/CN2021/116753, which was filed on Sep. 6, 2021. The present disclosure claims priority to Chinese Patent Application No. 202011505781.1, filed on Dec. 18, 2020 and entitled "VR Glasses".

TECHNICAL FIELD

The disclosure belongs to the technical field of virtual reality, and specifically, the disclosure relates to Virtual Reality (VR) glasses.

BACKGROUND

Virtual Reality (VR) glasses use a head-mounted display device to close people's vision and hearing from an outside world, and guide users to feel like they are in a virtual environment. The display principle is that left and right eye screens respectively display images of the left and right eyes, and the human eyes produce a three-dimensional effect in their minds after obtaining the different information.

When the VR glasses are used, in order to ensure a more comfortable usage experience and viewing effect, the user needs to adjust a distance between two lens barrels of the VR glasses according to an inter-pupillary distance of the user, but in a process of continuously adjusting the VR glasses in an art known to inventors, a sealing damage between lens barrels and a base is easily caused, the sealing effect is reduced, and dust is likely to enter the lens barrels, which causes the clearness of the VR glasses to decrease.

Therefore, it is necessary to improve the structure of the VR glasses to solve the problem that the sealing effect between the lens barrels and a bottom plate is reduced, and the clearness of the VR glasses is reduced.

SUMMARY

Some embodiments of the disclosure provide Virtual Reality (VR) glasses to solve the problem that the sealing effect between lens barrels and a bottom plate is reduced, and the clearness of the VR glasses is reduced.

Some embodiments of the disclosure provide VR glasses, which includes: a bottom plate, a first sealing part and a second sealing part, a first lens barrel and a second lens barrel; two communicating light-transmitting holes provided on the bottom plate symmetrically.

The first sealing part and the second sealing part are both made of a silica gel material and fixed on the bottom plate, and the first sealing part and the second sealing part are in one-to-one correspondence with positions of the two light-transmitting holes respectively.

The first lens barrel communicates with one of the two light-transmitting holes through the first sealing part, and the second lens barrel communicates with the other one of the two light-transmitting holes through the second sealing part, and the first lens barrel and the second lens barrel are configured to be able to move toward each other.

In some embodiments, the first sealing part and the second sealing part are provided with accordion-like structures along an opening direction of the light-transmitting holes, and in a state where a spacing between the first lens barrel and the second lens barrel changes, the first sealing part and the second sealing part are deformed through the accordion-like structures.

In some embodiments, the VR glasses further includes a pressing plate fixed on the bottom plate, wherein the pressing plate is configured to fixe sides of the first sealing part and the second sealing part that are close to the bottom plate on the bottom plate.

In some embodiments, an end of the first sealing part that is away from the bottom plate is provided with a first mounting groove, and an end of the second sealing part that is away from the bottom plate is provided with a second mounting groove, the first mounting groove wraps up an end of the first lens barrel that is close to the bottom plate, and the second mounting groove wraps up an end of the second lens barrel that is close to the bottom plate.

In some embodiments, the bottom plate is provided with a first mounting plate and a second mounting plate in parallel with a movement direction of the first lens barrel and the second lens barrel, and the first mounting plate and the second mounting plate are respectively disposed at two sides of the first lens barrel and the second lens barrel;

a first sliding plate and a second sliding plate are provided on the first lens barrel symmetrically, the first sliding plate is slidably disposed on the first mounting plate and the second sliding plate is slidably disposed on the second mounting plate;

a third sliding plate and a fourth sliding plate are disposed on the second lens barrel symmetrically, the third sliding plate is slidably disposed on the first mounting plate and the fourth sliding plate is slidably disposed on the second mounting plate.

In some embodiments, the fourth sliding plate extends toward a side where the second mounting plate is located, and a third mounting plate is disposed on the bottom plate, the third mounting plate is parallel with the second mounting plate and the first mounting plate, and the third mounting plate is provided with a first sliding groove.

The second lens barrel is fixedly provided with a first rack, a first gear and a second rack are disposed between the third mounting plate and the second mounting plate, the first gear is disposed between the first rack and the second rack, and both the first rack and the second rack are in mesh with the first gear; an end of the second rack passes through the first sliding groove, and when the second rack is pushed in a direction away from the first lens barrel, the first gear rotates clockwise, and the second lens barrel moves toward the first lens barrel.

In some embodiments, the VR glasses includes a boss provided between the third mounting plate and the second mounting plate, wherein the second rack is slidably disposed on the boss.

In some embodiments, a third rack is provided on a side, opposite to the first rack, of the second lens barrel, and the third rack is disposed toward the third mounting plate, a fourth rack is provided on a side of the first lens barrel close to the first mounting plate, the fourth rack and the third rack are oppositely disposed, the fourth rack and the third rack are in mesh with a second gear therebetween, an axis of the second gear is perpendicular to an axis of the first gear, when the first gear is in a clockwise rotation state, the second gear is also in a clockwise rotation state, and the first lens barrel and the second lens barrel move toward each other.

In some embodiments, a fixing post is provided on a position, corresponding to the second gear, of the bottom plate, the second gear is rotatably disposed on the fixing post.

In some embodiments, the first mounting plate and the second mounting plate are provided with prisms, and the first sliding plate, the second sliding plate, the third sliding plate and the fourth sliding plate all define second sliding grooves, the prisms are cooperated with the second sliding grooves to limit the first lens barrel and the second lens barrel.

Some embodiments of the disclosure improve the sealing structure between the lens barrels and the bottom plate. When the distance between the lens barrels is adjusted, the sealing structure is not easily damaged, a good sealing effect can be achieved, and the visual effect of the VR glasses is guaranteed.

Through the following detailed description of exemplary embodiments of the disclosure with reference to the accompanying drawings, other features and advantages of the disclosure will become clear.

BRIEF DESCRIPTION OF THE DRAWINGS

The drawings incorporated in the specification and constituting a part of the specification illustrate the embodiments of the disclosure, and together with the description are used to explain the principle of the present disclosure.

REFERENCE NUMERALS

Figure 1:
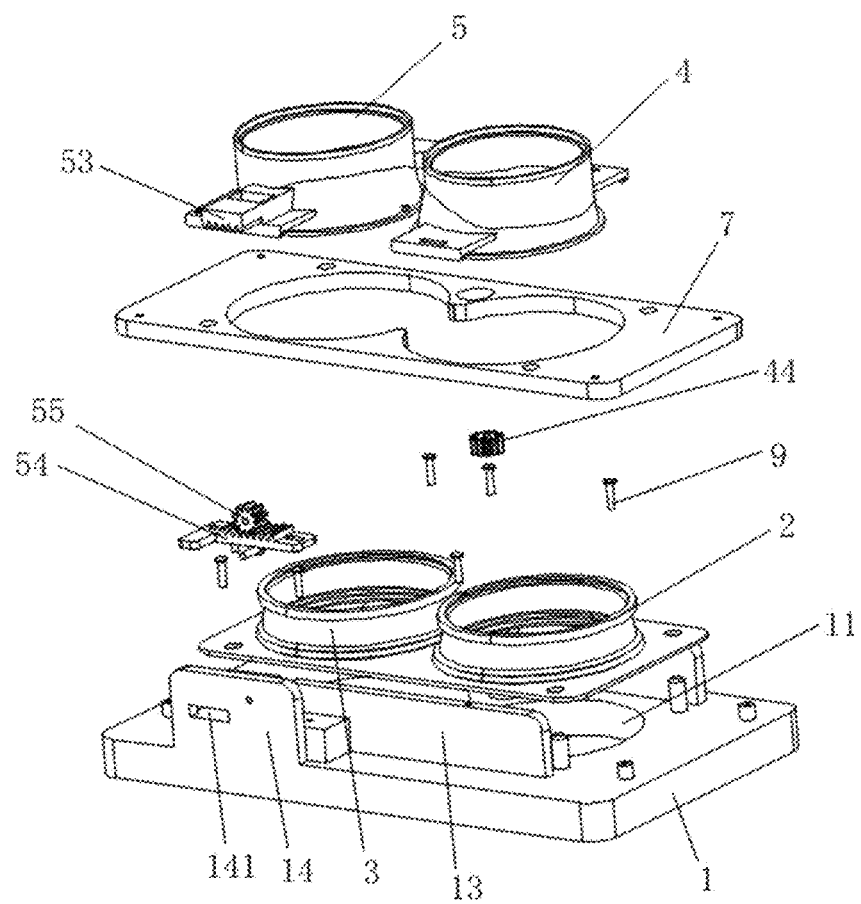
FIG. 1 is an exploded diagram of Virtual Reality (VR) glasses in an embodiment of the disclosure.

1. Bottom plate; 11. Light-transmitting hole; 12. First mounting plate; 13. Second mounting plate; 14. Third mounting plate; 141. First sliding groove; 2. First sealing part; 21. First mounting groove; 3. Second sealing part; 31. Second mounting groove; 4. First lens barrel; 41. First sliding plate; 42. Second sliding plate; 43. Fourth rack; 44. Second gear; 45. Fixing post; 5. Second lens barrel; 51. Third sliding plate; 52. Fourth sliding plate; 53. First rack; 54. Second rack; 55. First gear; 56. Boss; 57. Third rack; 6. Accordion-like structure; 7. Pressing plate; 8. Second sliding groove; 9. Prism.

Detailed Description of the Embodiments

Various exemplary embodiments of the disclosure will now be described in detail with reference to the accompanying drawings. It is to be noted that unless specifically stated otherwise, the relative arrangement, numerical expressions and numerical values of the components and steps set forth in these embodiments do not limit the scope of the disclosure.

The following description of at least one exemplary embodiment is actually only illustrative, and is by no means as any limitation to the disclosure and its disclosure or uses.

The techniques, methods, and apparatus known to those of ordinary skill in the relevant fields may not be discussed in detail, but where appropriate, the techniques, methods, and apparatus should be considered as part of the specification In all examples shown and discussed herein, any particular value should be construed as merely exemplary, rather than as a limitation. Therefore, other examples of the exemplary embodiment may have different values.

It is to be noted that similar reference numerals and letters indicate similar items in the following drawings, and therefore, once an item is defined in one drawing, it does not need to be further discussed in the subsequent drawings.

Figure 2:
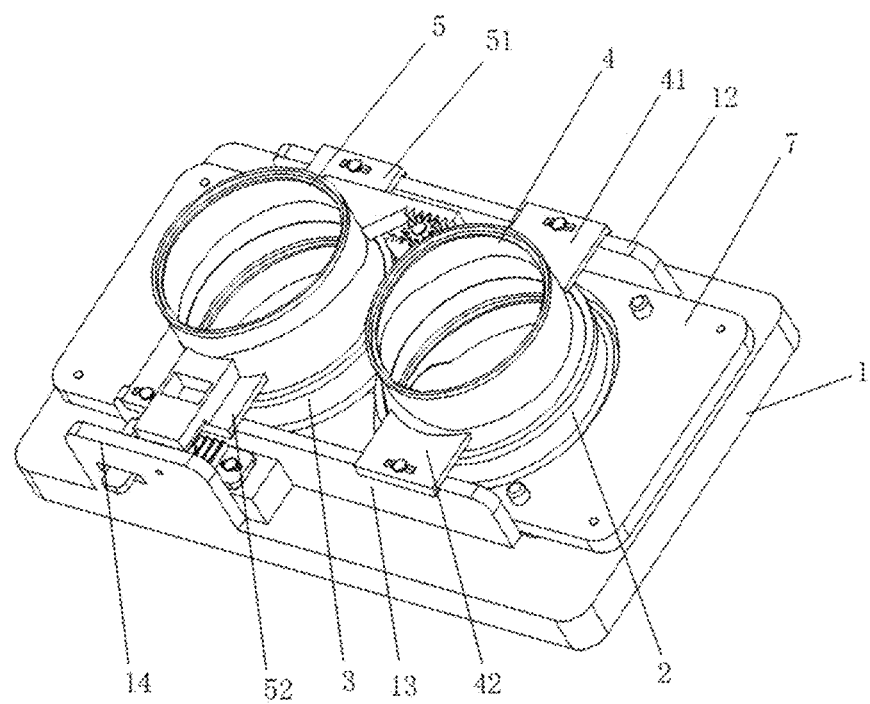
FIG. 2 is a schematic structural diagram of VR glasses in an embodiment of the disclosure.
Figure 3:
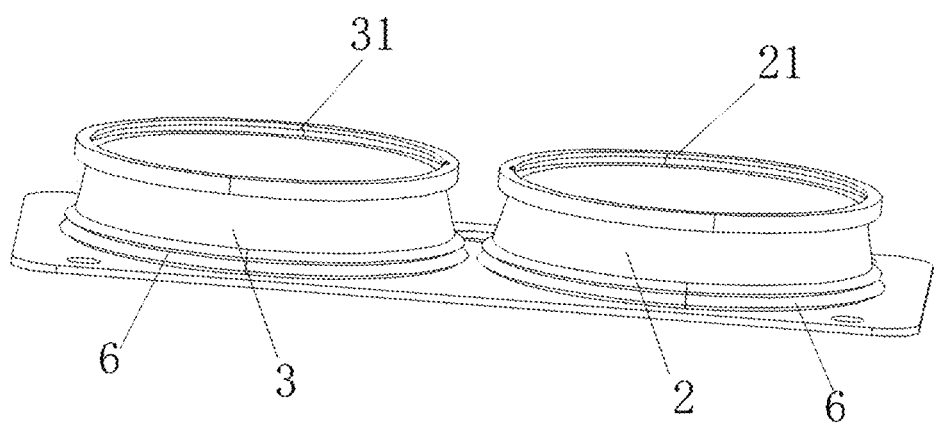
FIG. 3 is a schematic structural diagram of a first sealing part and a second sealing part of VR glasses in an embodiment of the disclosure.
Figure 4:
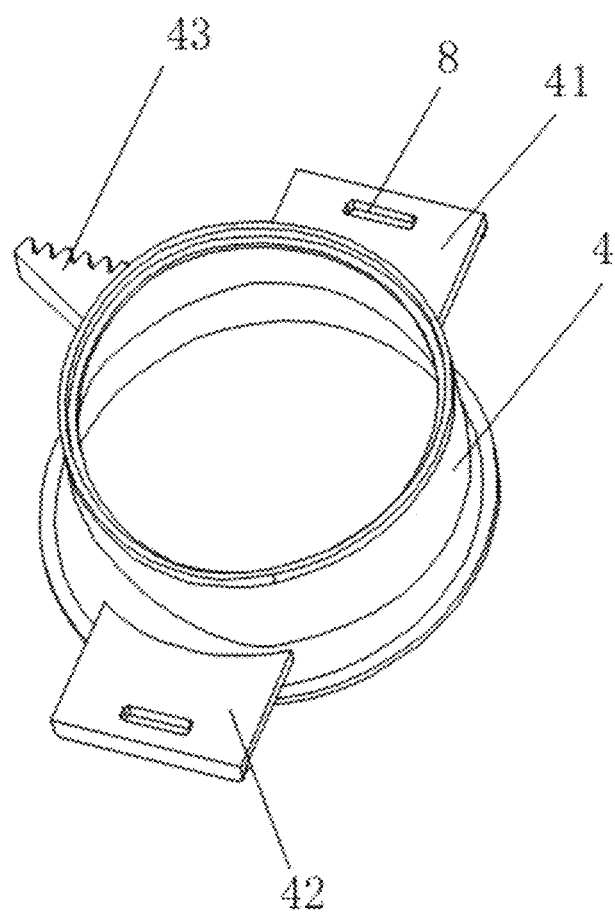
FIG. 4 is a schematic structural diagram of a first lens barrel in an embodiment of the disclosure.
Figure 5:
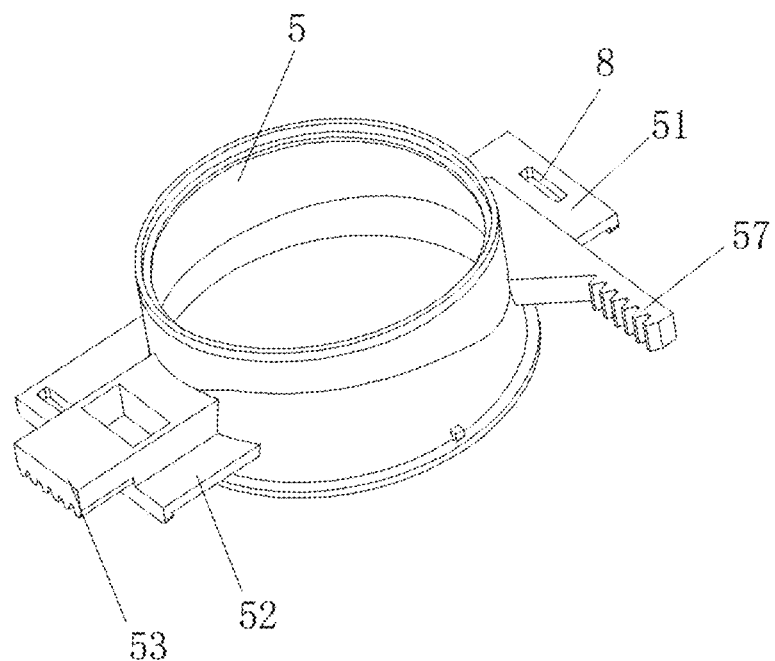
FIG. 5 is a schematic structural diagram of a second lens barrel in an embodiment of the disclosure.
Figure 6:
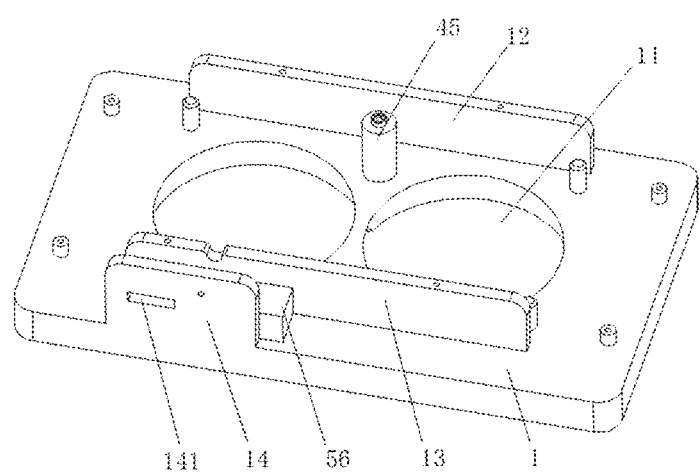
FIG. 6 is a schematic structural diagram of a bottom plate in an embodiment of the disclosure.

As shown in FIG. 1 to FIG. 6, some embodiments of the disclosure provide Virtual Reality (VR) glasses, which include: a bottom plate 1, a first sealing part 2 and a second sealing part 3, a first lens barrel 4 and a second lens barrel 5.

Wherein, two communicating light-transmitting holes 11 are provided on the bottom plate 1 symmetrically, the two light-transmitting holes 11 may communicate with each other, or may be two light-transmitting holes 11 defined separately.

The first sealing part 2 and the second sealing part 3 are both made of a silica gel material and fixed onto the bottom plate 1, and the first sealing part 2 and the second sealing part 3 are in one-to-one correspondence with positions of the two light-transmitting holes 11, respectively. In some embodiments, the silica gel material receives very small friction force during use, and meanwhile the silica gel material itself has higher abrasion resistance and is not easy to age. The silica gel material is used as a material of the first sealing part 2 and the second sealing part 3, so that an inside of the VR glasses is effectively sealed, and a problem that imaging effect is blurred and user experience is poor due to dust or water stains entering the inside of the VR glasses is prevented.

In some embodiments, the first lens barrel 4 communicates with one of the two light-transmitting holes 11 through the first sealing part 2, and the second lens barrel 5 communicates with the other one of the two light-transmitting holes 11 through the second sealing part 3, and the first lens barrel 4 and the second lens barrel 5 are configured to be able to move toward each other. The first lens barrel 4 and the second lens barrel 5 communicate with the light-transmitting holes 11, so that the user can clearly view images through the first lens barrel 4 and the second lens barrel 5. However, the inter-pupillary distance of each user is different, so when different users use the VR glasses, a distance between the first lens barrel 4 and the second lens barrel 5 needs to be adjusted to achieve the best viewing effect. In the process of adjusting the distance between the first lens barrel 4 and the second lens barrel 5, as the distance between the first lens barrel 4 and the second lens barrel 5 decreases or increases, the first sealing part 2 and the second sealing part 3 will be deformed, while the first sealing part 2 and the second sealing part 3 made of the silica gel material have little friction in the deformation process, and the silica gel material has characteristics of abrasion resistance and corrosion resistance, which can avoid erosion of impurities such as sweat, water stains, dust during daily use, can effectively seal the gap between the first lens barrel 4 and the bottom plate 1 and the gap between the second lens barrel 5 and the bottom plate 1, respectively for a long time, ensuring a clear imaging effect of the VR glasses and at the same time extending a service life of the VR glasses.

In some embodiments, the first sealing part 2 and the second sealing part 3 are provided with accordion-like structures 6 along an opening direction of the light-transmitting holes 11, and in a state where a spacing between the first lens barrel 4 and the second lens barrel 5 changes, the first sealing part 2 and the second sealing part 3 are deformed through the accordion-like structures 6. The accordion-like structures 6 may increase a deformation allowance of the first sealing part 2 and the second sealing part 3, so that an adjustable distance between the first lens barrel 4 and the second lens barrel 5 is increased to adapt to different inter-pupillary distances of different users. At the same time, the accordion-like structures 6 can also increase the number of deformations of the first sealing part 2 and the second sealing part 3, thereby prolonging the use time of the first sealing part 2 and the second sealing part 3, that is, further increasing the service life of the VR glasses.

In some embodiments, a pressing plate 7 is disposed on the bottom plate 1 fixedly, the pressing plate 7 fixes sides of the first sealing part 2 and the second sealing part 3 that are close to the bottom plate 1 on the bottom plate 1. In some embodiments, the first sealing part 2 and the second sealing part 3 are cylindrical, and the pressing plate 7 fixes bottoms of the first sealing part 2 and the second sealing part 3 on the bottom plate 1 to strengthen the connection of the first sealing part 2 and the second sealing part 3, which further improve the sealing effect of the first sealing part 2 and the second sealing part 3. At the same time, the fixed connection between the first sealing part 2 and the second sealing part 3, and the bottom plate 1 is not limited to the use of the pressing plate 7. Meanwhile, in order to improve the sealing effect, after the first sealing part 2 and the second sealing part 3 are connected to the bottom plate 1 in a sealed manner, the pressing plate 7 is still provided, so that the sealing effect is further enhanced through the pressing plate 7. Meanwhile, the pressing plate 7 should define openings for facilitating the movement of the first lens barrel 4 and the second lens barrel 5. In some embodiments, an auxiliary mounting plate is provided between the first sealing part 2 and the second sealing part 3, and the bottom plate 1, the first sealing part 2 and the second sealing part 3 are firstly fixed on the auxiliary mounting plate, and then the auxiliary mounting plate is fixed on the bottom plate to facilitate installation.

In some embodiments, an end of the first sealing part 2 that is away from the bottom plate 1 is provided with a first mounting groove 21, and an end of the second sealing part 3 that is away from the bottom plate 1 is provided with a second mounting groove 31, the first mounting groove 21 wraps up an end of the first lens barrel 4 that is close to the bottom plate 1, and the second mounting groove 31 wraps up an end of the second lens barrel 5 that is close to the bottom plate 1. The first sealing part 2 and the second sealing part 3 are cylindrical, and the first mounting groove 21 and the second mounting groove 31 are provided on the ends of the first sealing part 2 and the second sealing part 3 that are away from the bottom plate 1, the first mounting groove 21 and the second mounting groove 31 wrap up bottoms of the first lens barrel 4 and the second lens barrel 5 to further improve the sealing effect. Meanwhile, the bottoms of the first lens barrel 4 and the second lens barrel 5 may be bent in a direction away from a center line to form bent portions, and the bent portions of the first lens barrel 4 and the second lens barrel 5 are respectively clamped into the first mounting groove 21 and the second mounting groove 31, and the sealing effect of the first sealing part 2 and the second sealing part 3 on the first lens barrel 4 and the second lens barrel 5 is further improved.

In some embodiments, the bottom plate 1 is provided with a first mounting plate 12 and a second mounting plate 13 in parallel with a movement direction of the first lens barrel 4 and the second lens barrel 5, and the first mounting plate 12 and the second mounting plate 13 are respectively disposed at two sides of the first lens barrel 4 and the second lens barrel 5; the first lens barrel 4 and the second lens barrel 5 are disposed between the first mounting plate 12 and the second mounting plate 13.

In some embodiments, a first sliding plate 41 and a second sliding plate 42 are provided on the first lens barrel 4 symmetrically, the first sliding plate 41 is slidably disposed on the first mounting plate 12 and the second sliding plate 42 is slidably disposed on the second mounting plate 13; the first sliding plate 41 and the second sliding plate 42 cooperate with the first mounting plate 12 and the second mounting plate 13 respectively to achieve the sliding of the first lens barrel 4.

In some embodiments, a third sliding plate 51 and a fourth sliding plate 52 are disposed on the second lens barrel 5 symmetrically, the third sliding plate 51 is slidably disposed on the first mounting plate 12 and the fourth sliding plate 52 is slidably disposed on the second mounting plate 13. The third sliding plate 51 and the fourth sliding plate 52 cooperate with the first mounting plate 12 and the second mounting plate 13 respectively to achieve the sliding of the second lens barrel 5.

The sliding direction of the first lens barrel 4 and the second lens barrel 5 is parallel to a direction in which the first mounting plate 12 and the second mounting plate 13 extend, so that the sliding of the first lens barrel 4 and the second lens barrel 5 is not hindered, and the distance between the first lens barrel 4 and the second lens barrel 5 is smoothly adjusted.

In some embodiments, the fourth sliding plate 52 extends toward a side where the second mounting plate 13 is located, and a third mounting plate 14 is provided on the bottom plate 1, the third mounting plate 14 is parallel with the second mounting plate 13 and the first mounting plate 12, and a first sliding groove 141 is disposed on the third mounting plate 14.

In some embodiments, the second lens barrel 5 is fixedly provided with a first rack 53, a first gear 55 and a second rack 54 are disposed between the third mounting plate 14 and the second mounting plate 13, the first gear 55 is disposed between the first rack 53 and the second rack 54, and both the first rack 53 and the second rack 54 are in mesh with the first gear 55; an end of the second rack 54 penetrates the first sliding groove 141, and when the second rack 54 is pushed in a direction away from the first lens barrel 4, the first gear 55 rotates clockwise, and the second lens barrel 5 moves toward the first lens barrel 4.

By shifting the second rack 54 to use the first gear 55 for transmission, the first rack 53 drives the second lens barrel 5 to move, and the position of the second lens barrel 5 is adjusted. At the same time, by adjusting the position of the second lens barrel 5, a distance between the first lens barrel 4 and the second lens barrel 5 is adjusted. An end of the second rack 54 penetrates the first sliding groove 141 to facilitate the operation of the user, and the user only needs to shift the second rack 54 with one hand to adjust the position of the second lens barrel 5.

In some embodiments, the second rack 54 is of L-shaped, and the end of the second rack 54 penetrating into the first sliding groove 141 does not provided with a tooth groove, so as to avoid a problem that affects the smoothness of pushing movement due to an engagement between the second rack 54 and the first sliding groove 141 during the pushing process.

In some embodiments, a boss 56 is provided between the third mounting plate 14 and the second mounting plate 13, and the second rack 54 is slidably disposed on the boss 56. In order to reduce the volume of the first gear 55, the boss 56 is provided to reduce the distance between the first rack 53 and the second rack 54, so as to reduce the volume of the first gear 55 and improve the transmission efficiency of the first gear 55.

In some embodiments, a third rack 57 is provided on a side of the second lens barrel 5 opposite to the first rack 53, and the third rack 57 is disposed toward the third mounting plate 14, a fourth rack 43 is provided on a side, close to the first mounting plate 12, of the first lens barrel 4, the fourth rack 43 opposites to the third rack 57, the fourth rack 43 and the third rack 57 are in mesh with a second gear 44 therebetween, an axis of the second gear 44 is perpendicular to an axis of the first gear 55, when the first gear 55 is in a clockwise rotation state, the second gear 44 is also in a clockwise rotation state, and the first lens barrel 4 and the second lens barrel 5 move toward each other. When the user pushes the second rack 54, the first gear 55 rotates clockwise, and at this time, the second lens barrel 5 and the first lens barrel 4 move toward each other. The third rack 57 drives the second gear 44 to rotate, and the second gear 44 drives the fourth rack 43 to move in the direction where the second lens barrel 5 located. At this time, the first lens barrel 4 and the second lens barrel 5 move toward each other, which improves the efficiency of adjusting the distance between the first lens barrel 4 and the second lens barrel 5, and at the same time, the axis between the first lens barrel 4 and the second lens barrel 5 is always located at a center line of the bottom plate 1, so that the user experience is better.

In some embodiments, a fixing post 45 is provided at a position, corresponding to the second gear 44, of the bottom plate 1, the second gear 44 is rotatably disposed on the fixing post 45. The fixed post 45 is able to provide an installation position for the second gear 44, and keep the second gear 44 away from the first sealing part 2 and the second sealing part 3, so as to prevent the second gear 44, the third rack 57, and the fourth rack 43 from rubbing the first sealing part 2 and the second sealing part 3 during a transmission process, resulting in damages of the first sealing part 2 and the second sealing part 3.

In some embodiments, the first mounting plate 12 and the second mounting plate 13 are provided with prisms 9, and the first sliding plate 41, the second sliding plate 42, the third sliding plate 51 and the fourth sliding plate 52 all provided with second sliding grooves 8, the prisms 9 are cooperated with the second sliding grooves 8 to limit the first lens barrel 4 and the second lens barrel 5. The prisms 9 and the second sliding grooves 8 is able to limit the sliding range of the first lens barrel 4 and the second lens barrel 5, so as to prevent the movement range of the first lens barrel 4 and the second lens barrel 5 from being too large to drag the first sealing part 2 and the second sealing part 3, which causes damages to the first sealing part 2 and the second sealing part 3. At the same time, a problem that the lens may be damaged due to a collision of the first lens barrel 4 and the second lens barrel 5 is prevented.

While some specific embodiments of the disclosure have been described in detail by way of examples, it should be understood by those skilled in the art that the above examples are provided for illustration only and are not intended to limit the scope of the present disclosure. Those skilled in the art should appreciate that modifications may be made to the above embodiments without departing from the scope and spirit of the present disclosure. The scope of the disclosure is defined by the appended claims.

What is claimed is:

1. Virtual reality (VR) glasses, comprising:
   a bottom plate, two communicating light-transmitting holes being provided on the bottom plate symmetrically;
   a first sealing part and a second sealing part, the first sealing part and the second sealing part being both made of a silicone material and fixed onto the bottom plate, and the first sealing part and the second sealing part being in one-to-one correspondence with positions of the two light-transmitting holes respectively; and
   a first lens barrel and a second lens barrel, the first lens barrel communicating with one of the two light-transmitting holes through the first sealing part, and the second lens barrel communicating with the other one of the two light-transmitting holes through the second sealing part, and the first lens barrel and the second lens barrel being configured to be able to move toward each other,
   wherein the first sealing part and the second sealing part are provided with bellows-type structures along an opening direction of the light-transmitting holes, and in a state where a spacing between the first lens barrel and the second lens barrel changes, the first sealing part and the second sealing part are deformed through the bellows-type structures.

2. The VR glasses as claimed in claim 1, wherein the VR glasses further comprises a pressing plate fixed on the bottom plate, wherein the pressing plate is configured to fix an end of two ends of each of the first sealing part and the second sealing part that is closer to the bottom plate on the bottom plate.

3. The VR glasses as claimed in claim 1, wherein an end of two ends of the first sealing part that is more away from the bottom plate is provided with a first mounting groove, and an end of two ends of the second sealing part that is more away from the bottom plate is provided with a second mounting groove, the first mounting groove wraps up an end of two ends of the first lens barrel that is closer to the bottom plate, and the second mounting groove wraps up an end of two ends of the second lens barrel that is closer to the bottom plate.

4. The VR glasses as claimed in claim 1, wherein a first mounting plate and a second mounting plate in parallel with a movement direction of the first lens barrel and the second lens barrel are provided on the bottom plate, and the first mounting plate and the second mounting plate are respectively disposed at two sides of the first lens barrel and the second lens barrel;
   the first lens barrel is symmetrically provided thereon with a first sliding plate and a second sliding plate, the first sliding plate is slidably disposed on the first mounting plate and the second sliding plate is slidably disposed on the second mounting plate;
   the second lens barrel is symmetrically provided thereon with a third sliding plate and a fourth sliding plate, the third sliding plate is slidably disposed on the first mounting plate and the fourth sliding plate is slidably disposed on the second mounting plate.

5. The VR glasses as claimed in claim 4, wherein the fourth sliding plate extends toward a side where the second mounting plate is located, and a third mounting plate is disposed on the bottom plate, the third mounting plate is parallel with the second mounting plate and the first mounting plate, and the third mounting plate is provided with a first sliding groove;

the second lens barrel is fixedly provided with a first rack, a first gear and a second rack are disposed between the third mounting plate and the second mounting plate, the first gear is disposed between the first rack and the second rack, and both the first rack and the second rack are in mesh with the first gear; an end of the second rack passes through the first sliding groove, and when the second rack is pushed in a direction away from the first lens barrel, the first gear rotates clockwise, and the second lens barrel moves toward the first lens barrel.

6. The VR glasses as claimed in claim 5, wherein the VR glasses comprises a boss provided between the third mounting plate and the second mounting plate, wherein the second rack is slidably disposed on the boss.

7. The VR glasses as claimed in claim 5, wherein a third rack is provided on a side, opposite to the first rack, of the second lens barrel, and the third rack is disposed toward the third mounting plate, a fourth rack is provided on a side of the first lens barrel that is closer to the first mounting plate than the second mounting plate, the fourth rack and the third rack are oppositely disposed, the fourth rack and the third rack are in mesh with a second gear therebetween, an axis of the second gear is perpendicular to an axis of the first gear, when the first gear is in a clockwise rotation state, the second gear is also in a clockwise rotation state, and the first lens barrel and the second lens barrel move toward each other.

8. The VR glasses as claimed in claim 7, wherein a fixing post is provided on a position, corresponding to the second gear, of the bottom plate, and the second gear is rotatably disposed on the fixing post.

9. The VR glasses as claimed in claim 4, wherein the first mounting plate and the second mounting plate are provided with prisms, and the first sliding plate, the second sliding plate, the third sliding plate and the fourth sliding plate all provided with second sliding grooves, the prisms are cooperated with the second sliding grooves to limit the first lens barrel and the second lens barrel.

* * * * *